(12) United States Patent
Coulman

(10) Patent No.: US 7,322,148 B2
(45) Date of Patent: Jan. 29, 2008

(54) ICE RIGGER APPARATUS

(76) Inventor: Gary L. Coulman, 12501 Hebron Rd., Hebron, IL (US) 60034

( * ) Notice: Subject to any disclaimer, the term of this patent is extended or adjusted under 35 U.S.C. 154(b) by 0 days.

(21) Appl. No.: 11/185,990

(22) Filed: Jul. 20, 2005

(65) Prior Publication Data

US 2007/0017141 A1 Jan. 25, 2007

(51) Int. Cl.
*A01K 97/12* (2006.01)
*A01K 97/10* (2006.01)
(52) U.S. Cl. .................................. 43/17; 43/15; 43/16
(58) Field of Classification Search ................ 43/17, 43/16, 21.2
See application file for complete search history.

(56) References Cited

U.S. PATENT DOCUMENTS

| | | | |
|---|---|---|---|
| 1,021,147 A * | 3/1912 | Green | 43/17 |
| 3,199,241 A * | 8/1965 | Mauritz | 43/17 |
| 3,824,730 A * | 7/1974 | Johnson | 43/17 |
| 4,125,957 A * | 11/1978 | Cunningham | 43/17 |
| 4,522,572 A | 6/1985 | Hahn | |
| 4,651,459 A * | 3/1987 | Wurtz | 43/15 |
| 4,651,460 A | 3/1987 | Sykes | |
| 4,845,878 A * | 7/1989 | Hackel | 43/17 |
| 4,852,290 A * | 8/1989 | Wallace et al. | 43/17 |
| 4,993,182 A | 2/1991 | Monsen | |
| 5,025,583 A * | 6/1991 | Langley | 43/17 |
| 5,050,333 A * | 9/1991 | Debreczeni | 43/17 |
| 5,133,144 A * | 7/1992 | Formica | 43/17 |
| 5,832,652 A * | 11/1998 | Bartys | 43/17 |
| 5,890,312 A * | 4/1999 | Ball | 43/16 |
| 5,987,801 A * | 11/1999 | Anderson | 43/17 |
| 6,094,852 A | 8/2000 | Roach | |
| 6,158,160 A | 12/2000 | Sykes | |
| 6,354,036 B1 * | 3/2002 | Carlson et al. | 43/17 |

* cited by examiner

*Primary Examiner*—Darren W. Ark
*Assistant Examiner*—John Davis Holman
(74) *Attorney, Agent, or Firm*—Joseph S. Heino; Patrick M. Bergin

(57) ABSTRACT

An ice rigger apparatus has a planar base member that has an adjustable fishing rod holder at one end and a trip rod at the other end. The trip rod is rotatably mounted to the top surface of the base member and is disposed generally transversely to the base member. The trip rod includes means for releasably attaching a portion of a line to it, the line running from a fishing pole placed within the rod holder to a lure that is suspended in the water just below the ice. The trip rod also includes means for releasing an indicator flag when the lure has attracted a fish and the fish has taken the bait.

8 Claims, 5 Drawing Sheets

ICE RIGGER APPARATUS

FIELD OF THE INVENTION

This invention relates generally to items and accessories used by anglers in the sport of ice fishing. More particularly, it relates to an ice rigger apparatus of the type that is used by anglers to signal when a fish has been attracted to, and taken, the bait set by the angler. It also relates to an ice rigger apparatus that has an automatic line release feature incorporated into its design that allows the apparatus to be configured in a unique way.

BACKGROUND OF THE INVENTION

Although once a means for human survival, fishing in the modern age has evolved into more of a competitive and recreational sport. To increase their chances for a successful outing, modern anglers prefer to utilize equipment and devices that they know will work and that they can rely on. Though not completely fool-proof, many fishing accessories have improved simply because technology and manufacturing methods have improved as well. This makes fishing equipment more reliable and affordable. In the view of this inventor, however, there is always room for improvement of equipment and the traditional ice rigger is one such piece of equipment that anglers and others have sought to improve over the years.

The ice rigger has been a staple of ice fishing for many years. Many designs and configurations have been used. Ice riggers, or "tip-ups", of prior design tend to include three essential elements. One is a holder for fishing line. The second is some sort of trip mechanism. And the third is some sort of indicator mechanism. When used as intended, the fishing line holder allows for an amount of line to be fed out from the holder which then causes some sort of movement along the ice rigger. When the movement is detected, the trip mechanism is activated and the indicator mechanism, which is typically a brightly-colored flag or similar device, is raised to indicate to the angler that something has occurred below the ice. Although many different types of ice riggers exist in the knowledge and experience of this inventor, none of them are known by him include the special utility of allowing the angler's fishing pole to be secured to the device in a variety of positions and to use a specially-devised slack "take-up" mechanism to serve the combined function as the trip mechanism and the activator for the indicator, which is the flag.

Accordingly, it is an object of the present invention to provide a new and useful ice rigger apparatus that allows the angler to use his or her fishing rod with the apparatus and that allows the angler to set the position of the fishing rod in such a way that a trigger mechanism is actuated by a slight "take-up" in slack in the line coming from the reel of the fishing rod. It is another object to provide such an ice rigger apparatus whereby the trigger mechanism uses a minimal number of parts and a minimal number of steps to use, but which is also reliable in its operation. It is yet another object to provide such an ice rigger apparatus whereby the apparatus is manufactured of durable material, is relatively lightweight, strong, and no more expensive to produce than currently available parts are, and perhaps even less so, thus making the apparatus useful and affordable in its design and construction.

SUMMARY OF THE INVENTION

The ice rigger apparatus of the present invention has obtained these objects. It provides for a substantially planar base member that has a top surface and a bottom surface. The bottom surface lays on the ice. The top surface includes an adjustable fishing rod holder at one end and a trip rod at the other end. The trip rod is rotatably mounted to the top surface of the base member. That is, the trip rod is disposed generally transversely to the base member and is supported by two circular "eyes" within which the trip rod can rotate about its longitudinal axis. The trip rod includes means for releasably attaching a portion of a line to it, the line running from a fishing pole placed within the rod holder to a lure that is suspended in the water just below the ice. The trip rod also includes means for releasing an indicator flag when the lure has attracted a fish and the fish has taken the bait.

The foregoing and other features of the present invention will be apparent from the detailed description that follows.

DETAILED DESCRIPTION

Figure 1:
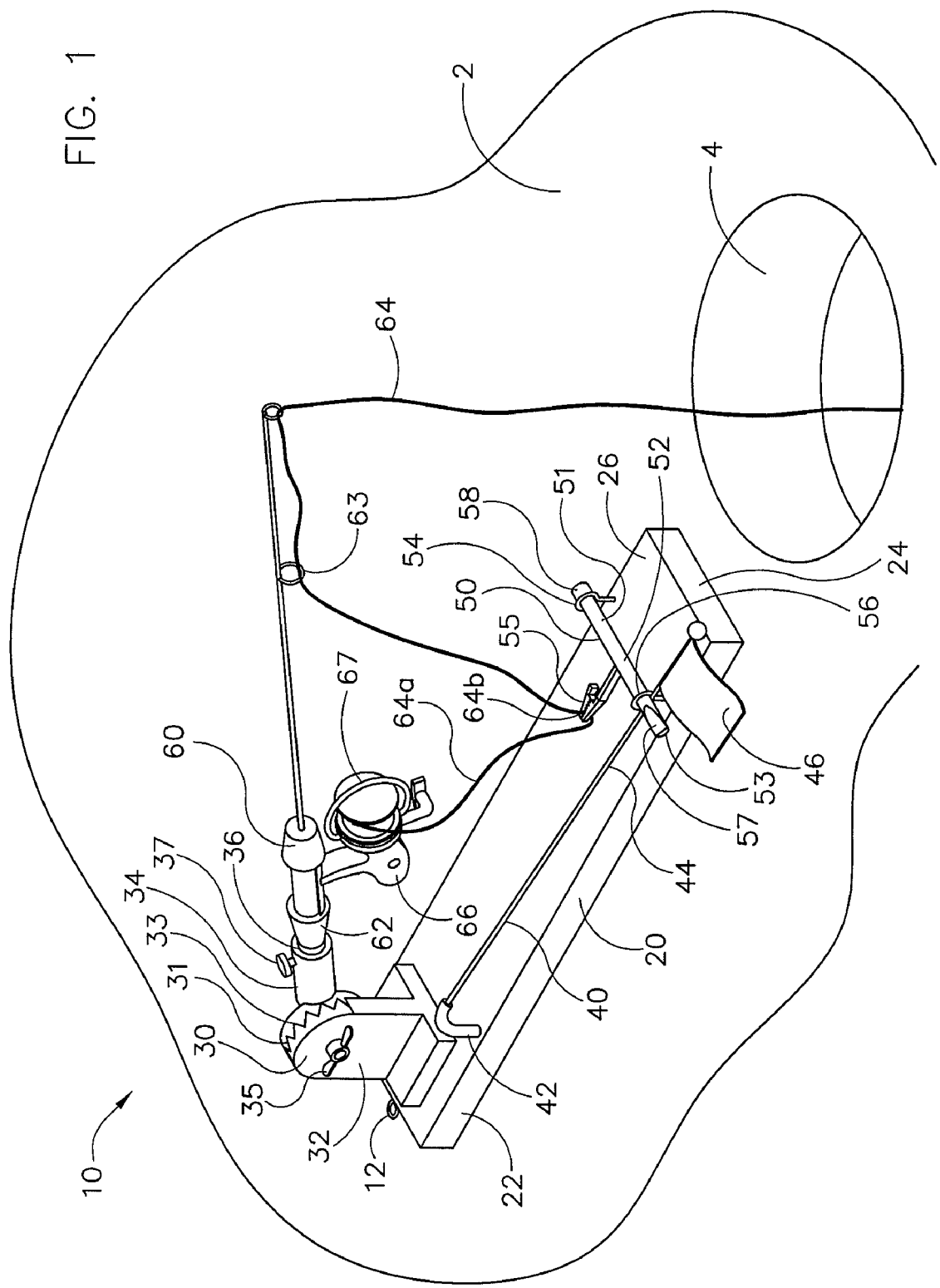
FIG. 1 is a top, front and left side perspective view of a preferred embodiment of an ice rigger apparatus constructed in accordance with the present invention.

Referring now to the drawings in detail wherein like numbers represent like elements throughout, FIG. 1 illustrates an ice rigger apparatus, generally identified 10, that is constructed in accordance with the present invention. More specifically, FIG. 1 illustrates a substantially planar base member 20 that has a top surface 26 and a bottom surface 28. The bottom surface 28 of the base member 20 simply lays on top of the ice 2 and next to a hole 4 that has been cut into the ice 2. The base member 20 is a generally longitudinally-extending member that also includes a first end 22 and a second end 24. In the preferred embodiment, the base member 20 can be constructed of a plank of wood or of a durable, weather-resistant plastic material. Such is not a limitation of the present invention, however. An anchor hook 12 is provided at the first end 22 of the base member 20 such that an attachment means (not shown) can be used to prevent the base member 20 from sliding across the ice 2 or, even worse, into the hole 4. The type of attachment means used is not a limitation of the present invention either and any suitable means for maintaining the position of the base member 20 is acceptable.

The top surface 26 of the base member 20 generally includes an adjustable fishing rod holder 30 and a bendable or flexible "alert" flag 40 at the first end 22 and a trip rod 50 at the second end 24.

The adjustable fishing rod holder 30 includes a base portion 32 and a rod-receiving portion 34. The base portion 32 of the rod holder 30 is secured to the top surface 26 of the base member 20 by means of a plurality of apertures (not shown) defined in it, each aperture being used to receive a fastener (also not shown) through it. Other suitable attachment means would be acceptable and such is not a limitation of the invention. Extending upwardly from the base portion 32 and being integrally formed as part of it is a ratchet face 31. Extending downwardly from the rod-receiving portion 34 is a second ratchet face 33, the first and second ratchet faces 31, 33 being engagable with one another by use of a wing nut 35. In this fashion, the elevation of the rod-receiving portion 34 of the rod holder 30 can be varied as desired or required by the angler. When supported within the rod holder 30, a fishing rod 60 will extend generally longitudinally relative to the base member 20. That is, the rod 60 will be generally aligned with the base member 20 which maximizes the support of the rod 60 within the holder 30.

The rod-receiving portion 34 also includes an opening 36 defined within it, the opening 36 being functionally adapted to receive the handle portion 62 of the fishing rod 60 within it. To secure the handle portion 62 of the rod 60 within opening 36 of the rod-receiving portion 34 and to prevent the rod 60 from coming out of the opening 36 following a fish strike or hit, a threaded rod lock 37 is provided to one side of the rod-receiving portion 34.

Figure 2:
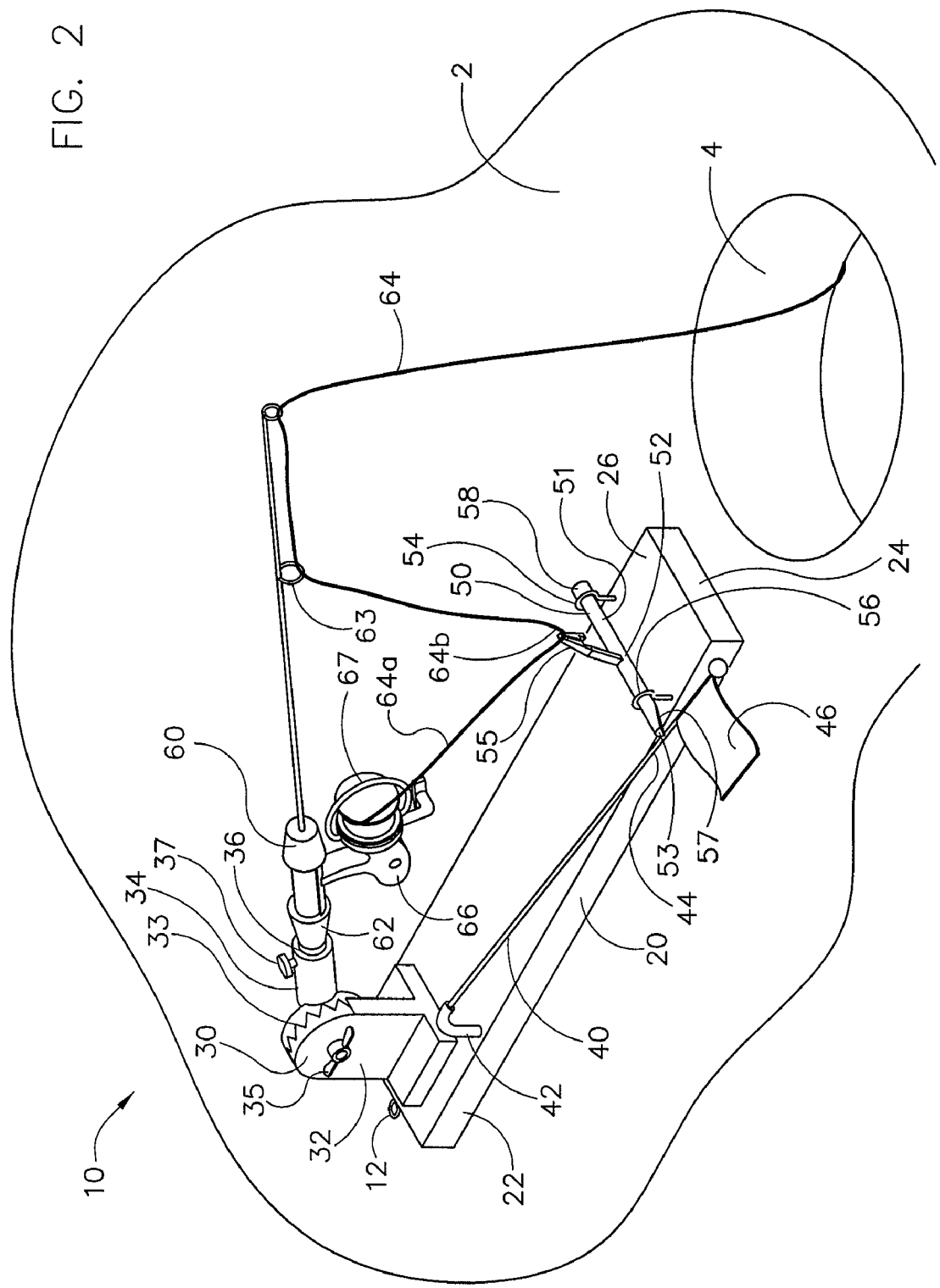
FIG. 2 is a view of the ice rigger apparatus illustrated in FIG. 1 and showing some of the slack in the fishing line being taken up by a fish striking the lure.
Figure 3:
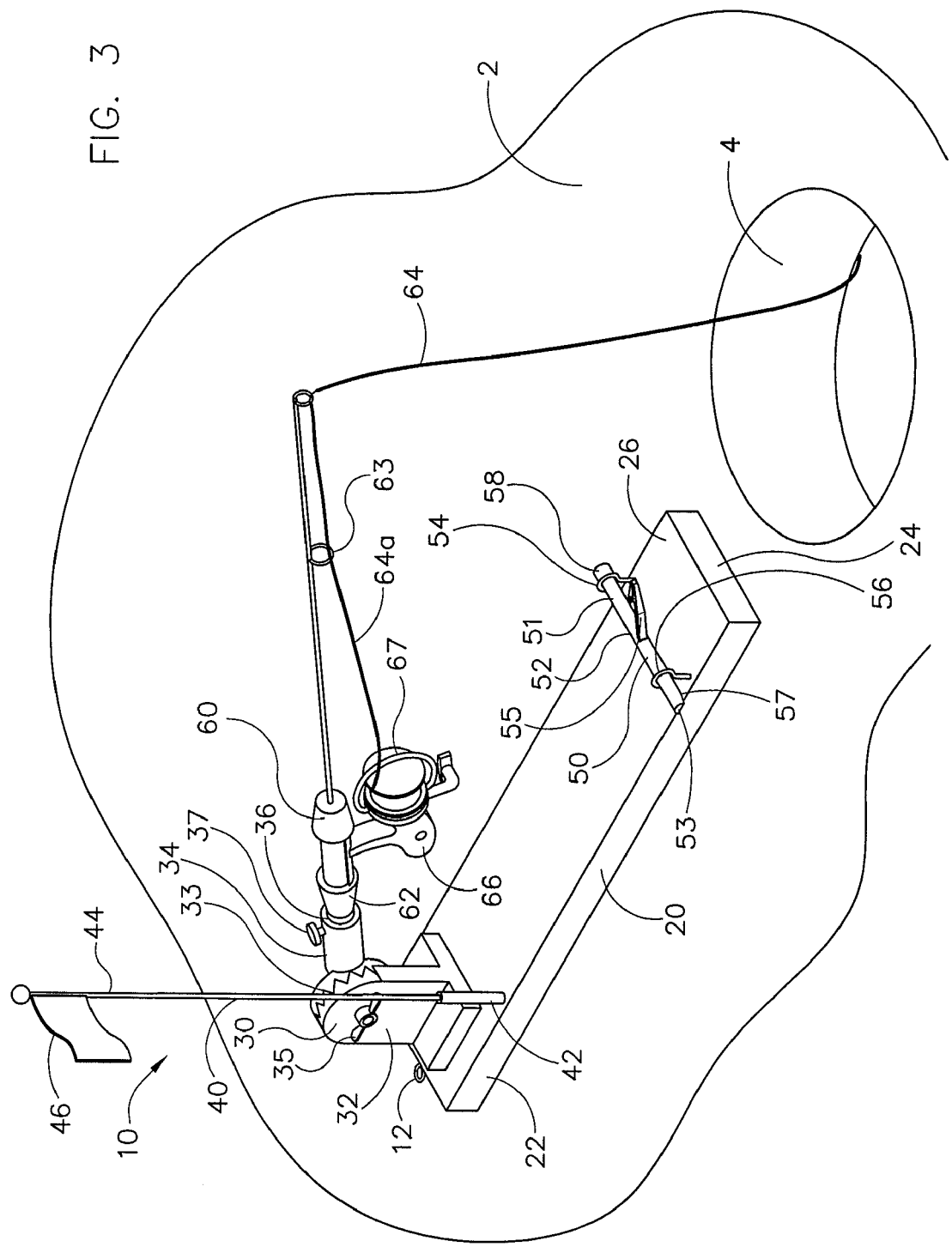
FIG. 3 is another view of the ice rigger apparatus illustrated in FIGS. 1 and 2 and showing the position of the fishing line and the "alert" flag following release by the trip rod.
Figure 4:
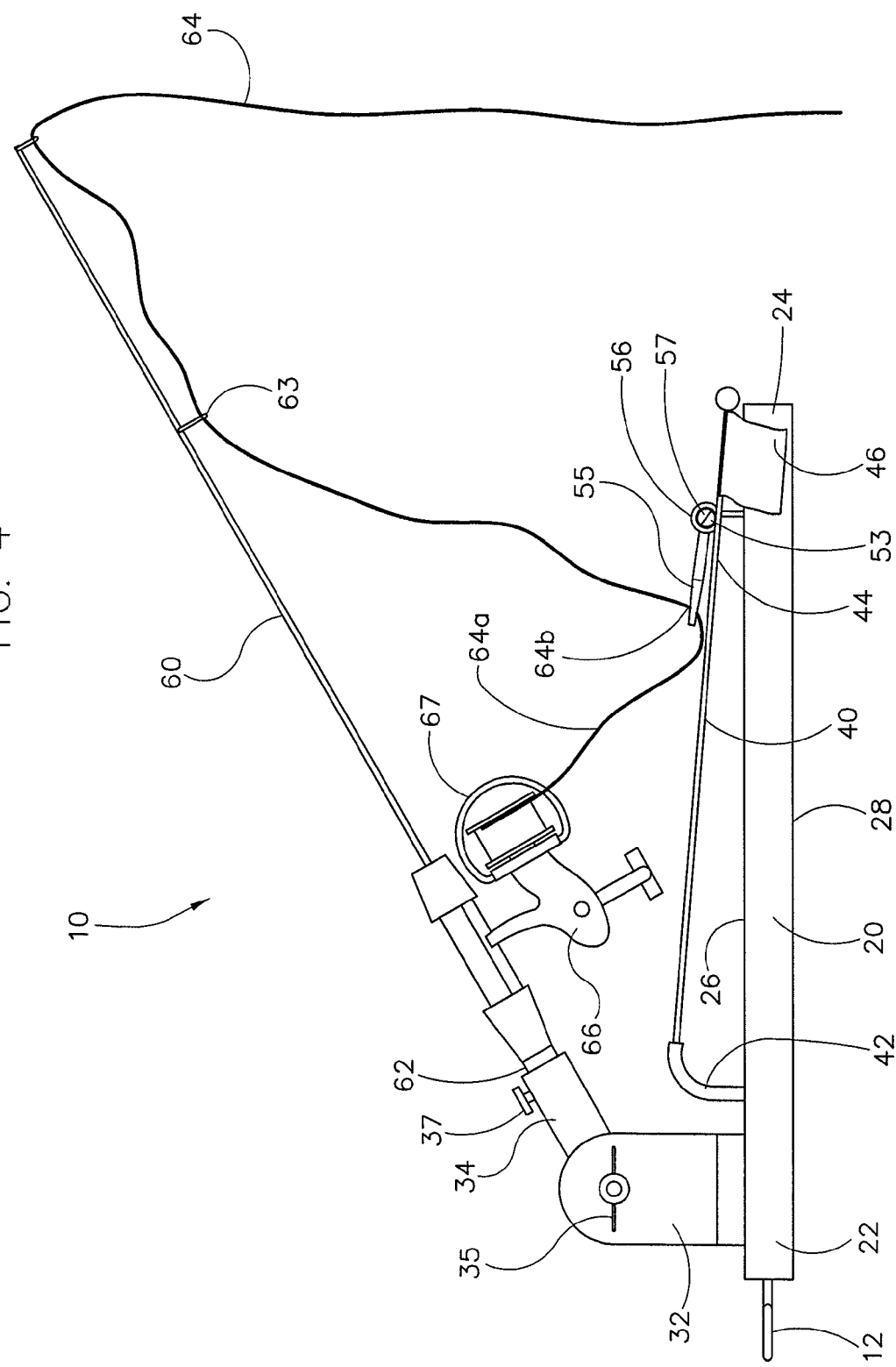
FIG. 4 is a slightly enlarged left side elevational view of the ice rigger apparatus illustrating the pre-release position of the fishing line, the flag and the trip rod.
Figure 5:
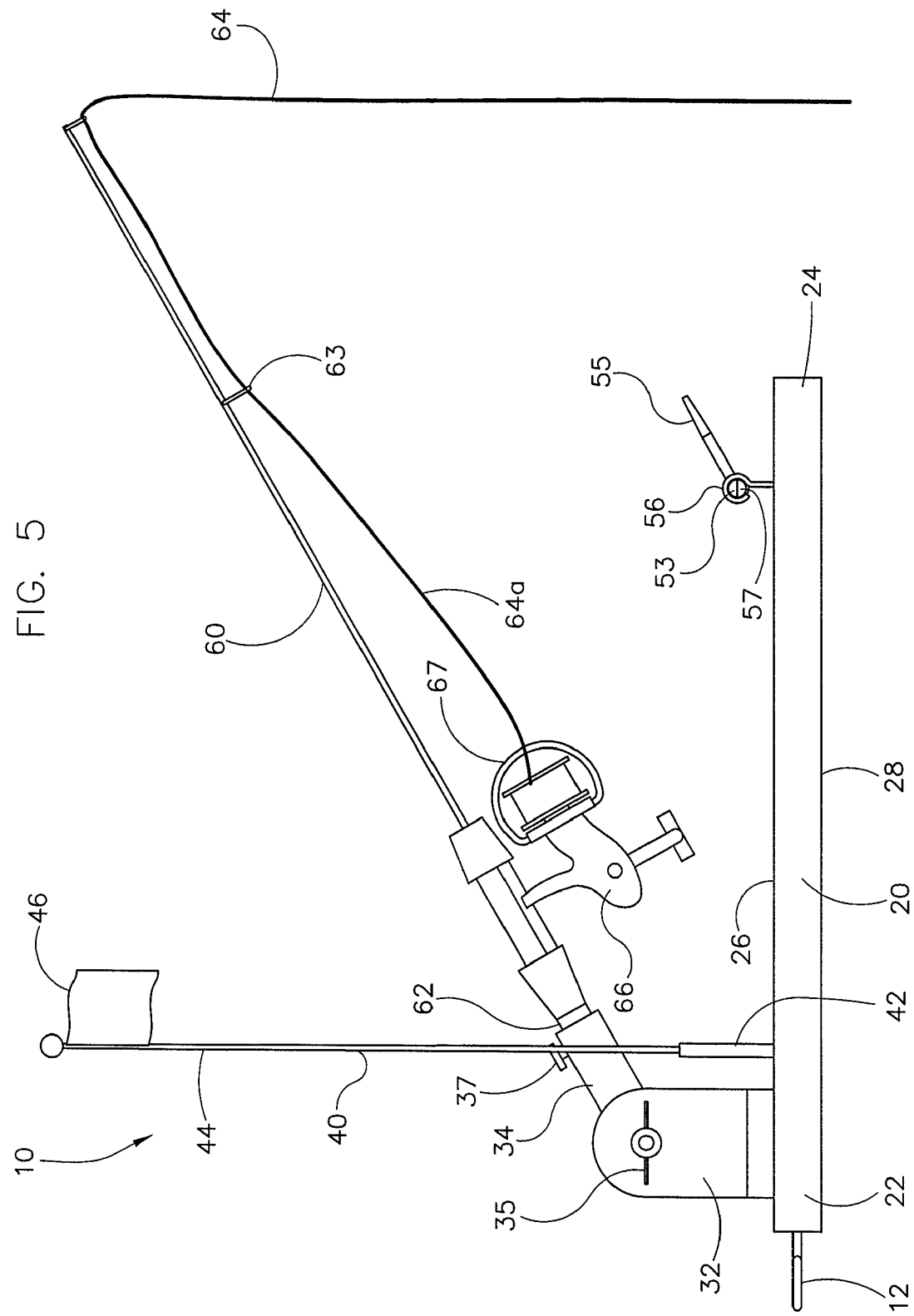
FIG. 5 is a view of the ice rigger apparatus illustrated in FIG. 4 and showing the post-release position of the fishing line, the flag and the trip rod.

The first end 22 of the base member 20 also includes a flexible or bendable "alert" flag 40. That is, the flag 40 is intended to call attention to, or "alert", the angler to the fact that a fish strike has likely occurred when the flag 40 is in its upright position, as is shown in FIGS. 3 and 5. The alert flag 40 includes a bottom-most portion 42 that is anchored to the base member 20 and an upper-most portion 44 to which is attached a brightly-colored flag 46, the flag 46 indicating a fish "strike" when in the upright or raised position and no action when in the "down" position as shown in FIGS. 1, 2 and 4. In the "down" position, the flag 40 is disposed generally longitudinally relative to the base member 20. In the raised position, the flag 40 is substantially perpendicular to the plane in which the base member 20 lies.

The trip rod 50 of the ice rigger apparatus 10 is secured to the second end 24 of the base member 20. The trip rod 50 is generally disposed laterally, or transversely, relative to the base member 20 and relative to the fishing rod 60 when the fishing rod 60 is properly positioned within the rod holder 30. The trip rod 50 is constructed of a length of rod-like material 52 that is circular in cross-section. In the preferred embodiment, the trip rod 50 is made of a length 52 of polyvinyl chloride, or PVC, material, although other materials could likely be used without deviating from the scope of the present invention. The benefit of using such a material is that a reduced amount of friction is created between the trip rod 50 that is made of such material and another object or objects. For example, the trip rod 50 has a first end 51 and a second end 53. The trip rod 50 is mounted slightly above the top surface 26 of the base member 20, sufficiently high enough to allow the upper-most portion 44 of the flag 40 to fit underneath it. To accomplish this, a pair of eyelets 54, 56 are provided. The opening of each eyelet 54, 56 is sufficiently large to allow the trip rod 50 to freely rotate within them, but not so large as to allow the first end 51 of the trip rod 50 to pass through the eyelet 54 when a plastic cap 58 is applied to that end 51 of the rod 50. Here again, the material of choice allows the trip rod 50 to have a minimal amount of friction between it and the eyelets 54, 56 within which the trip rod 50 is rotatably movable. The second end 53 of the trip rod 50 is tapered 57 on one side at an angle. The purpose of this structure and configuration will be apparent later in this detailed description. Disposed towards the center of the trip rod 50 is a clip-like member 55, preferably of the type known as an "alligator" clip 55. The purpose of the clip 55 is to retain a portion 64b of the line 64 within it. See FIGS. 1 and 4.

In application, the ice rigger apparatus 10 of the present invention is placed next to a hole 4 that has been cut or augered through the ice 2. The ice rigger apparatus 10 is anchored to the ice 2 by use of the anchor hook 12 which prevents the apparatus 10 being pulled closer to the hole 4 than is desired by the angler, and which could result in the angler losing the apparatus 10 altogether. The adjustable rod holder 30 is set to the desired angle by backing off the wing nut 35, positioning the rod-receiving portion 34 as desired, and then re-tightening the wing nut 35. The angler then places the handle portion 62 of the rod 60 into the opening 36 of the rod-receiving portion 34 and secures the handle 62 within the opening 36 by means of the threaded rod lock 37. After the angler determines the depth that is preferred for fishing, a desired amount of line 64, with a lure (not shown) attached, is lowered through the hole 4 in the ice 2. A small amount 64a of the line 64 is "slacked" between the reel 66 and the first eyelet 63 of the fishing rod 60. At a point 64b along the slacked portion 64a of the line 64, the clip 55 is attached to that point 64b in the line 64. The bail 67 on the reel 66 is opened so that line 64 can flow freely from the reel 66 which a fish strikes. To "set" the ice rigger apparatus 10, the uppermost portion 44 of the flag 40 is placed under the tapered 57 end 53 of the trip rod 50. While the clip 55 rests on the base member 20, the taper 57 of the trip rod 50 is generally horizontal, thus maintaining the flag 40 under the trip rod 50. The angler then patiently waits for a fish strike.

When a fish eventually does strike the lure and the slack in the line 64 is taken up, that portion 64b of the line 64 captured within the clip 55 causes the trip rod 50 to rotate to the point that the alert flag 40 engages the taper 57 of the trip rod 50. In this position, the alert flag 40 slides upwardly and outwardly, along the taper 57 of the trip rod 50, to the point that the alert flag 40 is released from the trip rod 50, resulting in the flag 40 quickly moving to an upright position and signaling the angler of the need to check the ice rigger apparatus 10 for a fish. Here again, the amount of friction between the trip rod taper 57 is desired to be minimal so as to allow the flag 40 to move relatively freely along the taper 57 and not be stopped by any frictional forces along the way. It is this movement of the flag 40 along the taper 57 of the trip rod 50 that allows the apparatus 10 of the present invention to function as intended.

Based upon the foregoing, it will be seen that there has been provided a new and useful ice rigger apparatus that allows the angler to use his or her fishing rod with the apparatus and that allows the angler to set the position of the fishing rod in such a way that a trigger mechanism is actuated by a slight "take-up" in slack in the line coming from the reel of the fishing rod; whereby the trigger mechanism uses a minimal number of parts and a minimal number of steps to use; and whereby the apparatus is manufactured of durable material, is relatively lightweight, strong, and no more expensive to produce than currently available parts are, making the apparatus useful and affordable as well.

The principles of this invention having been fully explained in connection with the foregoing, I hereby claim as my invention:

1. An ice rigger apparatus for use with a fishing rod, the fishing rod being of the type having a reel and a supply of fishing line that is fed from an open bail, which comprises:
   a base member having a first end and a second end;
   a fishing rod holder, the rod holder being attached to the first end of the base member and being adjustable such that the angle of the rod holder with respect to the base can be changed;
   a alert flag having a flexible base, the flag base being attached to near the first end of the base member,
   a pair of aligned eyelets attached to the second end of the base member;
   a trip rod, the trip rod being inserted through the aligned eyelets at the second end of the base member such that horizontal translation of the trip rod is not permitted but axial rotation of the trip rod is permitted, the trip rod having a tapered end;
   a clip that is attached to the trip rod, the clip being operable to pinch a slack portion of fishing line such that the fishing line is not allowed to slide through the clip unless such clip is released, the clip being operable between a first slack position when the fishing line is slack to a second tension position when the fishing line is under tension, the clip being operable to rotate the trip rod when the clip moves between the slack position and the tension position, the rotation of the trip rod causing the alert flag to engage the taper of the trip rod; thereby sliding the alert flag along the taper of the trip rod until the alert flag is released from the tip rod, resulting in the alert flag moving to an upright position.

2. The ice rigger apparatus of claim 1 wherein the fishing rod holder includes means for securing a handle of the fishing rod within the rod holder to prevent removal from the rod holder.

3. An ice rigger apparatus for use with a fishing rod, the fishing rod being of the type having a reel and a supply of fishing line that is fed from an open bail, which comprises:
   a base member, the base member having a first end, and second end and a top surface;
   a fishing rod holder attached to the top surface of the base member at the first end of the base member, and being adjustable such that the angle of the rod holder with respect to the base can be changed;
   a flexible alert flag attached to the top surface of the base member near the first end of the base member;
   a pair of aligned eyelets attached to the top surface of the second end of the base member;
   a trip rod, the trip rod being inserted through the aligned eyelets such that the horizontal translation of the trip rod is not permitted but axial rotation of the trip rod is permitted, the trip rod having a tapered end;
   a clip that is attached to the trip rod, the clip being operable to pinch a slack portion of fishing line such that the fishing line is not allowed to slide through the clip unless such clip is released, the clip being operable between a first slack position when the fishing line is slack to a second tension position when the fishing line is under tension, the clip being operable to rotate the trip rod when the clip moves between the slack position and the tension position, the rotation of the trip rod causing the alert flag to engage the taper of the trip rod; thereby sliding the alert flag along the taper of the trip rod until the alert flag is released from the tip rod, thereby permitting the alert flag to move to an upright position.

4. The ice rigger apparatus of claim 3 wherein the base member is a longitudinally-extending member and the fishing rod holder and the flag are attached to the base member in a generally longitudinally-extending position and the trip rod is attached to the base member in a generally transversely-disposed position.

5. The ice rigger apparatus of claim 4 wherein the fishing rod holder includes means for securing a handle of the fishing rod within the rod holder to prevent removal from the rod holder.

6. The ice rigger apparatus of claim 5 wherein the trip rod includes a second end and the trip rod is supported above the top surface of the base member by at least two eyelets and the trip rod is supported within the eyelets by a cap placed over the second end of the trip rod.

7. The ice rigger apparatus of claim 6 wherein the trip rod comprises a solid piece of plastic material.

8. The ice rigger apparatus of claim 6 wherein the trip rod comprises a rod-like solid piece of polyvinyl chloride.

* * * * *